United States Patent [19]

Sugimura et al.

[11] Patent Number: 4,526,205
[45] Date of Patent: Jul. 2, 1985

[54] PULSATION ABSORPTION DEVICE FOR HIGH PRESSURE LIQUID

[76] Inventors: Kazuo Sugimura; Nobuyuki Sugimura, both of 308, Mabase, Shimizu-shi, Shizuoka-ken, Japan

[21] Appl. No.: 86,663

[22] Filed: Oct. 18, 1979

[51] Int. Cl.³ .............................................. F16L 55/04
[52] U.S. Cl. ........................................ 138/30; 251/50; 251/321
[58] Field of Search ................. 138/26, 30; 220/85 B; 251/50, 321

[56] References Cited

U.S. PATENT DOCUMENTS

| | | | |
|---|---|---|---|
| 3,169,551 | 2/1965 | Lewis | 138/26 |
| 3,333,600 | 8/1967 | Mercier | 138/30 X |
| 3,853,147 | 12/1974 | Cibulka | 138/30 |
| 3,868,972 | 3/1975 | Zirps | 138/30 |
| 4,056,127 | 11/1977 | Greer | 138/30 |
| 4,205,637 | 6/1980 | Ito et al. | 138/30 |

FOREIGN PATENT DOCUMENTS

16-5789 3/1941 Japan.

*Primary Examiner*—James E. Bryant, III
*Attorney, Agent, or Firm*—Wood, Dalton, Phillips, Mason & Rowe

[57] ABSTRACT

Pulsation absorption device comprising a pressure vessel, a bladder housed in the pressure vessel, liquid incoming and outgoing paths formed by dual cylinders placed under the pressure vessel, a valve system for opening and closing said liquid incoming and outgoing paths, said valve system includes a dash pot means for slowly opening and closing a valve body whereupon the valve body is controlled from being abruptly moved with rapid streaming speed of high pressure liquid or pressure variation thereby the function of pulsation absorption is more enhanced and any trouble and damage to the pressure accumulator system is avoided.

12 Claims, 17 Drawing Figures

PULSATION ABSORPTION DEVICE FOR HIGH PRESSURE LIQUID

This invention relates to a pulsation absorption system for high pressure liquid connected to hydraulic piping or the like.

Generally pressure liquid ejected from the hydraulic system, particularly from pumps accompanies pulse and such pulse renders undesirable effects to the whole system.

For absorbing pulses of this kind, a pressure accumulator is generally used. However with this, the highest frequency of pulse liquid that has been enabled to be absorbed numbers only one hundred cycles. For absorbing pulses of several hundred cycles, it is not possible to absorb with such accumulator.

Japanese Patent No. 479,913 (Patent Publication No. SHO 41-5789) teaches that it is possible to absorb pulse amounting to several hundred cycles by providing a liquid incoming path from the pump piping to the liquid chamber of a pressure vessel with a bladder housed therein and separately providing a liquid outgoing path from said liquid chamber to piping of various loading devices. Thus, it is said, the pulse to be delivered from the piping to the bladder can be absorbed.

Also this patent teaches that it is possible to deliver pressure liquid from outer piping to the liquid chamber for uniformly working to the whole circumference of the bladder by forming a liquid incoming path and outgoing path with dual piping for incoming and outgoing liquid thereby contraction and expansion of the bladder is smoothly performed without any eccentricity and also by providing valve means to liquid incoming path and outgoing path respectively, the bladder is prevented from being caught in the liquid incoming and outgoing pathes, thus the bladder is protected from being locally injured.

However, the pulse absorbing device of this Japanese Patent is able to perform its pulse absorbing function for applying to the hydraulic circuit in which liquid flowing speed is 7 m/sec or less. Therefore it is not possible to apply to the hydraulic circuit of today in which liquid flowing speed is 7 m/sec or higher. Because if the liquid flowing speed becomes faster, the valve body tends to become turbulent as it is affected by flowing speed. Particularly when the side of liquid outgoing path is non-loaded, its side becomes to negative pressure and its path will be interrupted.

Therefore, one object of the present invention is to avoid the valve body from being opened or closed abruptly due to pressure liquid flowing with high speed.

Another object of the present invention is to provide a pulse absorption device that is able to absorb pulse of several hundred cycles completely.

Still another object of the present invention is to provide a pulse absorption device that is able to effectively absorb pulse.

The pulse absorption system of the present invention consists of a pressure vessel, bladder housed in the pressure vessel, valve means for opening and closing the liquid incoming and outgoing pathes formed by dual cylinders under the pressure vessel and by providing a dash pot for slowing down the opening and closing the valve body, thus a unique pulse absorbing for high pressure liquid is accomplished.

Other objects and features of the present invention will be better understood as description proceeds with reference to accompanying drawings in which:

FIGS. 3-8 are, each cross section view of embodiments in which a valve body is supported with a guide member consisting of dual cylinders.

Figure 1:
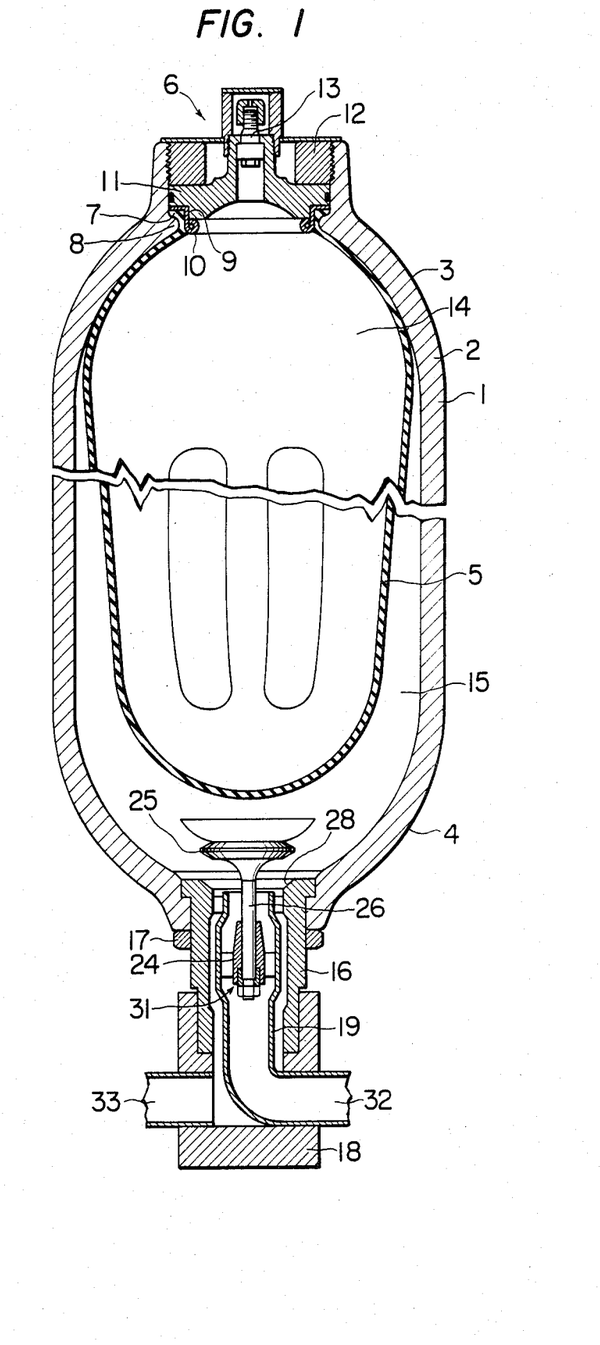
FIG. 1 is a longitudinal cross section view of one embodiment of the present invention with some parts omitted for clarity of illustration.

Referring now to FIG. 1, numeral 1 generally designates a pressure vessel made of metal appropriate to pressure applied. This vessel is formed of a cylindrical body 2 with an upper end 3 and lower end 4, each semispherically shaped. 5 is a bladder made of natural or synthetic rubber shaped after the pressure vessel 1. 6 is an upper opening through which the bladder 5 is inserted in the pressure vessel 1. The top periphery of the bladder 5 is formed to a flange 7 which is placed and supported on the step portion 8 formed along the upper inner wall of the pressure vessel 1. On this flange 7, a protector ring 9 is closely placed, which ring is downwardly extended as a skirt over the inner periphery of the flange 7 and its bottom is rolled back to form an annular tube. Thus this protector ring 9 prevents the bladder from being injured by its sharp bending when it floats upward with liquid pressure and at the same time, this ring serves as a packing for this flange portion 8 of the bladder 5. 11 is a lid metal on the flange 7 and tightened with a ring nut 12 threadly screwed in the opening 6. 13 is a gas port provided in the lid metal 11 through which nitrogen gas is supplied into the bladder 5. Thereby a gas chamber 14 formed in the bladder is pressurized with liquid flowing into a liquid chamber 15 in the vessel.

Figures 2, 2A:
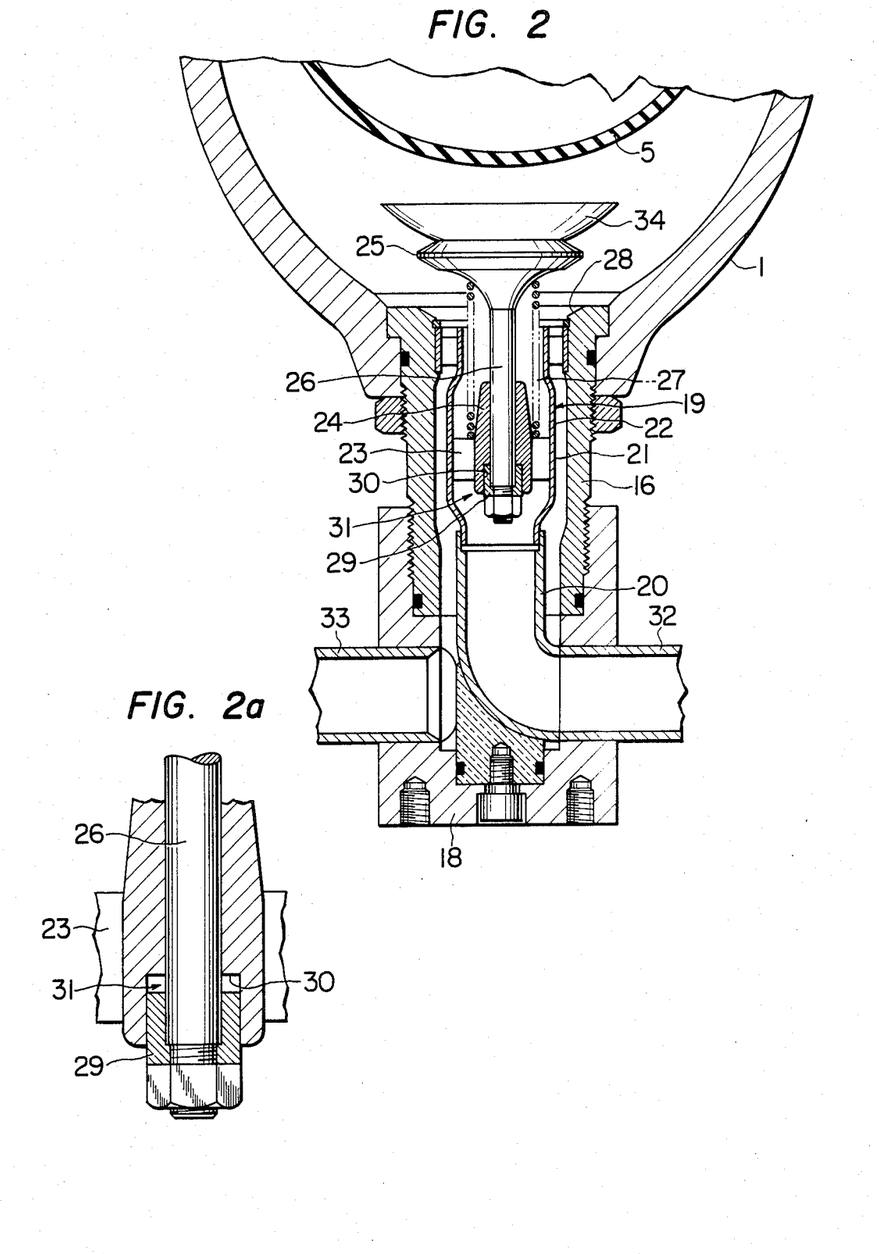
FIG. 2 is a detailed cross section view of the essential part of FIG. 1.
FIG. 2a is an enlarged view of the essential part of FIG. 2.

16 is a cylindrical coupling secured to the bottom of the pressure vessel 1 with a ring nut 17. 18 is a base cylinder connected to the lower end of said coupling 16. 19 is an inner duct concentrically provided in the coupling 16 for incoming liquid. In the annular space between this inner duct 19 and coupling 16, an outgoing liquid path is formed. As shown in FIG. 2, this inner duct 19 is consisted of a lower elbow duct 20 and an upper duct 22 having enlarged portion 21. In the upper duct 22, a valve stem casing 24 is supported with a plurality of arms 23.

A valve body 25 is slidably supported relative to the inner duct 19 as its valve stem 26 is inserted in said valve stem casing 24 and with the force of a spring 27, it is held in the position in FIG. 2 when non-loaded. When the valve body 25 is subjected to a downward force, this valve body 25 is seated on the seat 28 formed on the top inner periphery of the cylindrical coupling 16. At the lower end of the valve stem 26, a piston 29 is inserted in a cylinder portion 30 to form a dash pot 31 (FIG. 2a). As shown in FIG. 2, this dash pot 31 functions when the valve body 25 is in a position to be pushed upward with the force of spring 27 and when an instantaneous abrupt closing downward force is imparted to the valve body 25, its speed is lowered thereby the valve body 25 is slowly moved. 32 is an inlet for pressure liquid. 33 is an outlet of pressure liquid. 34 is a bladder receiving cup attached to the valve body 25.

Figures 3, 3A:
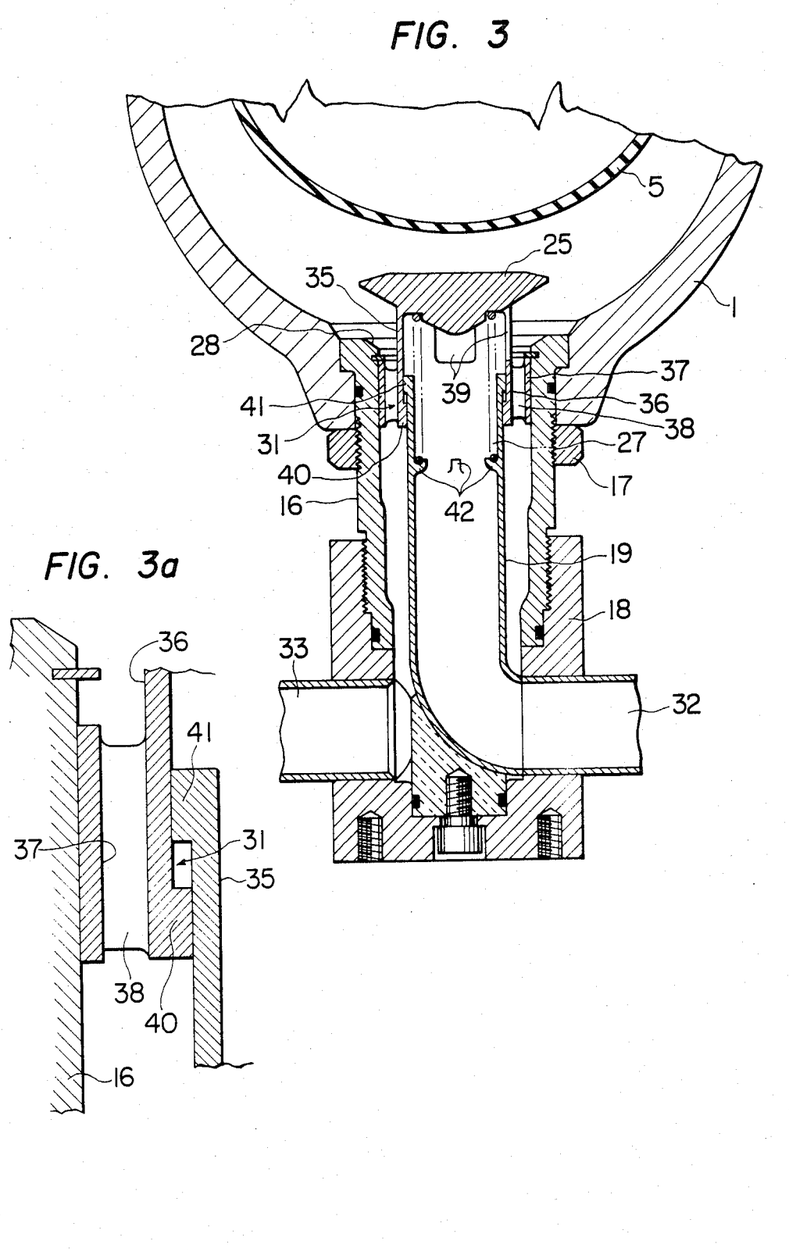
FIG. 3 is a cross section view of an essential part of an example in which a dash pot is formed with an inner duct and inner cylinder of guide member.
FIG. 3a is an enlarged view of the dash pot portion in FIG. 3.

In FIG. 3 and FIG. 3a, instead of the valve stem 26 slidingly guides the valve body 25 of FIG. 2, there is shown another guide member 35 consisting of double cylinders.

This guide member 35 is consisting of an inner cylinder 36 the top end of which is attached to the valve body 25 and slidably engaged with its inner duct 19 and an outer cylinder 37 slidable along the inside of the coupling 16. These inner and outer cylinders 36, 37 are integrally connected with a plurality of arms 38 spanned therebetween. The upper portion of the inner cylinder 36 is provided a plurality of apertures 39. The lower end of it is formed an inwardly stepped portion 40 and with an outwardly stepped portion 41 formed at the top end of the inner duct 19, there is formed a dash pot 31. A spring 27 is interposed between a plurality of nails 42 formed on the inner wall of duct 19 and the neck portion of the valve body 25 where the upper end of the inner cylinder 36 joints therewith.

Same parts having same numerals in this Figure with those in FIGS. 1 and 2 perform same function.

Figures 4, 4A:
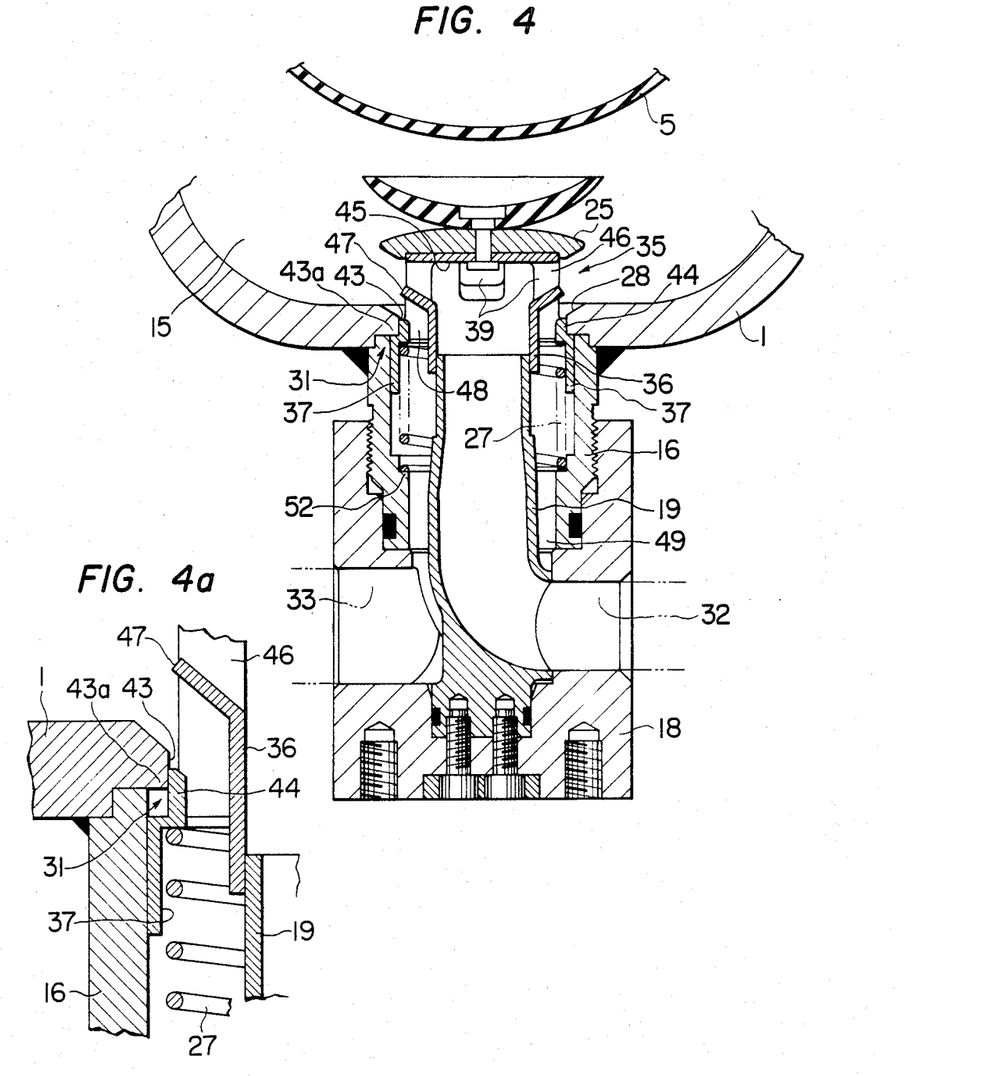
FIG. 4 is a cross section view of an essential part of one embodiment in which a dash pot is formed with an outer cylinder of guide member and outer coupling.
FIG. 4a is an enlarged view of the dash pot in FIG. 4.

In FIG. 4 and FIG. 4a, an example is shown in which the top end of the outer coupling 16 is weldingly connected to the bottom of the pressure vessel 1 and the dash pot 31 is formed with the outer sliding cylinder 37 of the guide member 35 and outer coupling 16.

The inner diameter of the outer coupling 16 is made somewhat larger than the bottom opening 43 of the pressure vessel 1 and in the lower end periphery of the opening 43 is formed a step portion 43a. The top end of the outer cylinder 37 is formed a small diametered portion 44 to be abutted to the bottom of said step portion 43a, thus there is formed a dash pot 31 with the step portion 43a and small diametered portion 44.

The top end of the inner sliding cylinder 36 of guide member is provided with a hood plate 45 secured to the valve body 25 and the upper portion of this cylinder has a plurality of apertures 39. From the sides of the apertures 39, ribs 46 are extended. The lower portions of ribs 46 extend passing through the flared portion 47 and integrally joined with the small diametered portion 44 of the outer sliding cylinder 37. The liquid chamber 15 communicates through a passage 48 partitioned by under flared portion 47 and ribs 46 to an annular outlet path 49 between the inner duct 19 and outer coupling 16.

Figure 5:
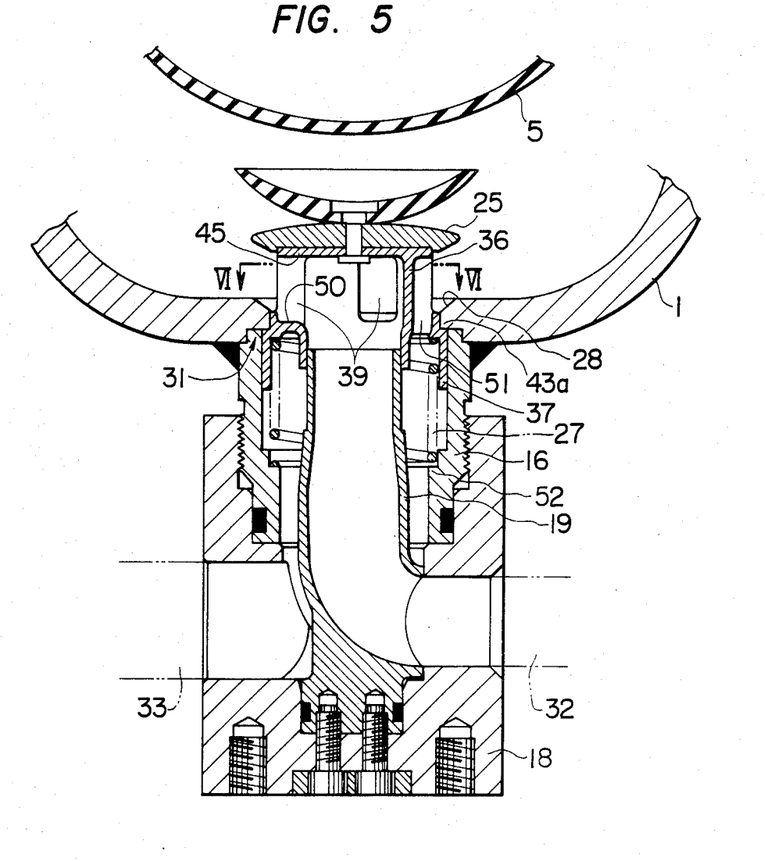
FIG. 5 is a cross section view of an essential part similar to that in FIG. 4.
Figure 6:
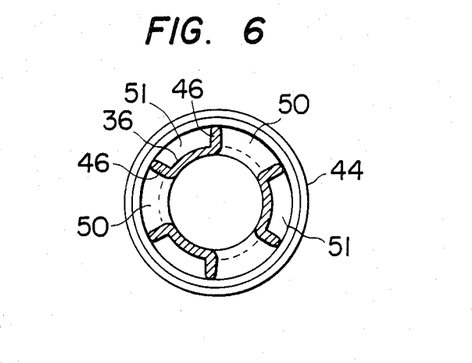
FIG. 6 is a cross section view taken along the line VI—VI in FIG. 5.

FIG. 5 shows a modification of the guide member 35 in the embodiment of FIG. 4. Instead of the flared portion 47 in FIG. 4, the inner sliding cylinder 36 and outer cylinder 37 are connected with a flange portion 50. In the flanged portion 50, flowing out ports 51 are bored as seen in FIG. 6. A spring 27 seats on the step portion 52 of the outer coupling 16 and the top end of it abuts the under side of the flanged portion 50. The same parts of same numerals in FIGS. 4-6 as those in FIGS. 1-3 have same functions.

Figures 7, 8:
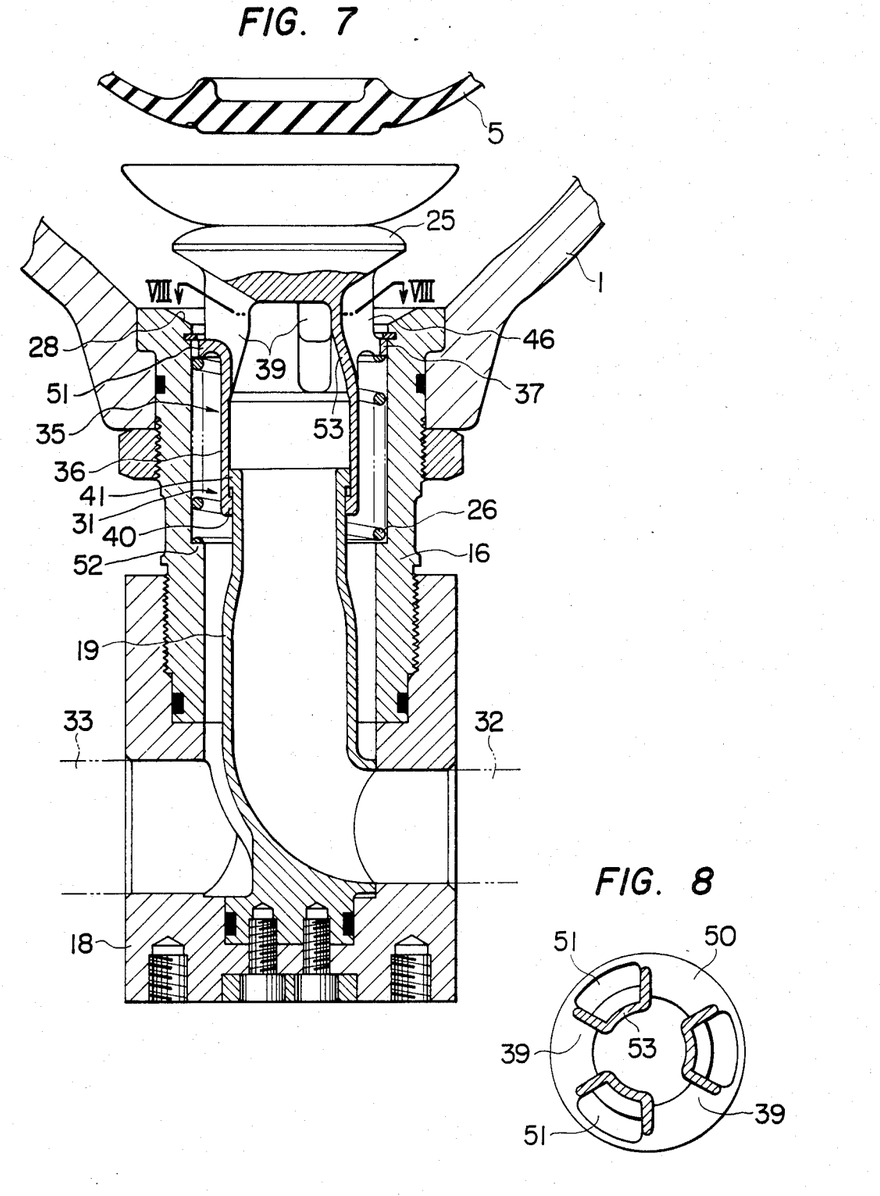
FIG. 7 is a cross section view of an essential part of a modification of that in FIG. 4.
FIG. 8 is a cross section view taken along the line VIII—VIII in FIG. 7.

Examples shown in FIGS. 7 and 8 are, each a modification of the guide member 35 and inner cylinder 19 of the embodiment in FIG. 3.

In this Figure, the dash pot 31 is formed, as in FIG. 3, with the step portion 41 of the inner duct 19 and the step portion 40 of the inner sliding cylinder 36. While the inner sliding cylinder 36 and outer sliding cylinder 37 are connected with the flanged portion 51 as like that in FIG. 3, the inner sliding cylinder 36 has an upwardly reduced portion 53 with which the valve body 25 is supported. In the circumferential periphery of this reduced portion 53, apertures 39 are bored. Other parts having same numerals in this Figure, with those in FIGS. 1-6 have same functions.

Figure 9:
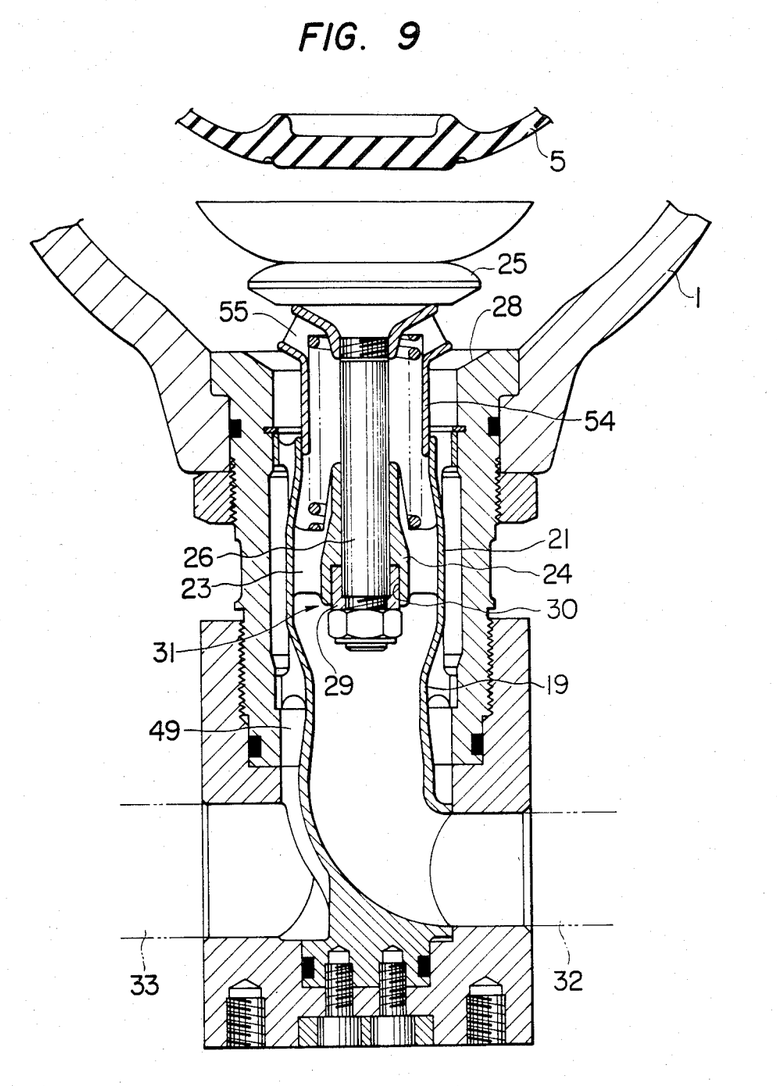
FIG. 9 is a cross section view of an essential part of an example of a modification of guide member for the valve body.

FIG. 9 shows a modification of the example in FIG. 2. Therein the dash pot 31 is formed with the piston 29 provided in the lower end of valve stem 26 and cylinder portion 30 formed in the lower end of the valve stem casing 24. 54 is a cylindrical member supported by the valve stem 26 and slidable against the inner duct 19 and the upper end of it is provided a liquid port 55. This cylindrical member controls liquid turbulence of incoming and outgoing under side of the valve body as like shown in FIG. 2.

Figure 10:
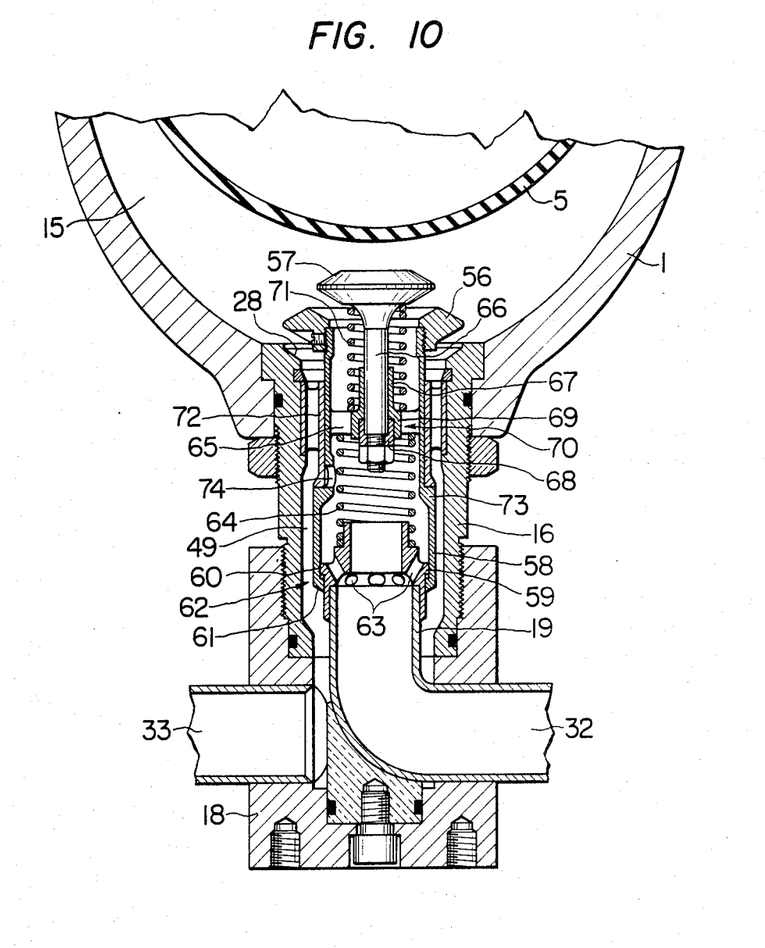
FIG. 10 is a cross section view of an essential part of an example of valve system with an inner valve body for inlet path of pressure liquid and an outer valve body for the side of outgoing liquid path.
Figure 11:
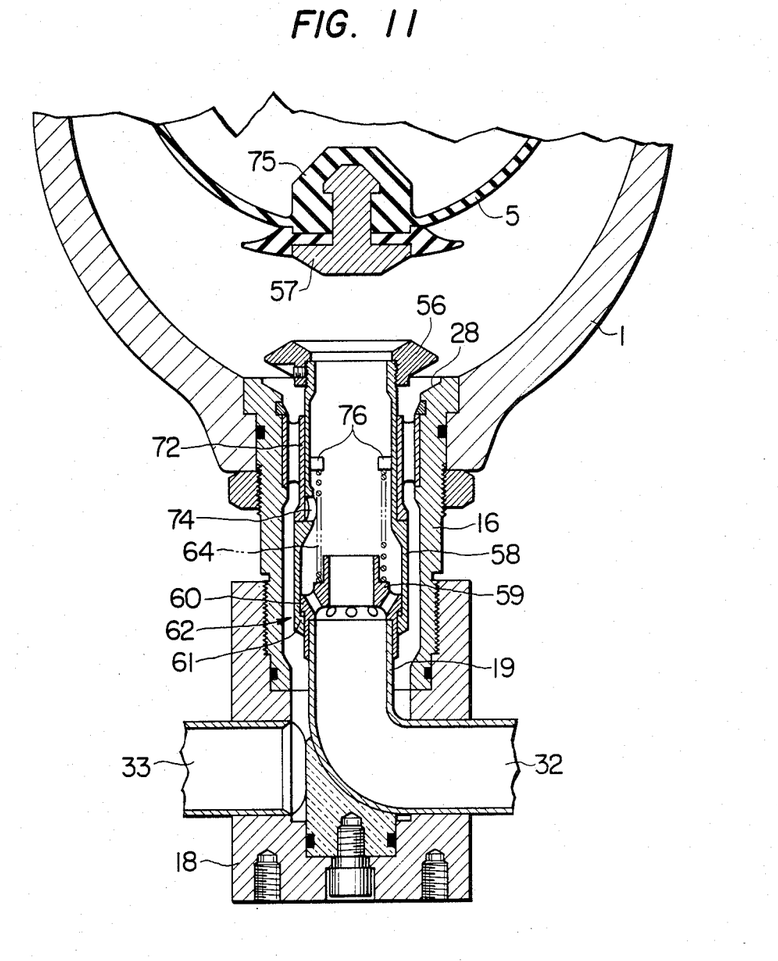
FIG. 11 is a cross section of an essential part showing that the inside valve shown in FIG. 10 is mounted to the bottom of the bladder.

In FIGS. 10 and 11, for the incoming liquid path from the inner duct 19 to the liquid chamber 15 and for the outgoing liquid path from the liquid chamber 15 to the liquid outgoing path formed between the inner duct 19 and outer coupling 16, respective valve systems are provided. In FIG. 10, the valve system is consisted of an annular main valve body 56 and an auxiliary valve head 57 that seats on the annular valve body 56. The main valve body 56 is supported by a guide cylinder 58 and the lower portion of the guide cylinder 58 is slidably held with the guide portion 59 mounted to the top end of the inner duct 19. With the step portion 60 of this guide portion 59 and step portion 61 at the lower end of the guide cylinder 58, a dash pot 62 is formed. The guide portion 59 is provided with a plurality of ports 63 for flowing liquid in the inner duct 19 into the guide cylinder 58 and holds a spring 64 for always urging the guide cylinder 58 upward. The top end of the spring 64 abuts against a plurality of arms 65 provided on the inner wall of the guide cylinder 58 and the arms 65 support the valve stem casing 67 which further holds the valve stem 66. To this valve stem 66 of auxiliary valve head 57, a piston 68 is provided. Also to the lower end of the valve stem casing 67, a cylinder portion 69 is provided. With these, the dash pot 70 is formed. 71 is a spring to push the auxiliary valve 57 upward. 72, a fixed housing cylinder to hold sliding of the guide cylinder 58. As the lower end of this housing cylinder 72 abuts to the flanged portion 73 of guide cylinder 58, the position of upper limitation of the cylinder 58 is governed. 74, a port provided at the lower end of the guide cylinder 58. When the valve body 56 comes to seat on the seat 28 at the top end of the outer coupling 16, the path in the duct 19 and path formed between the inner duct 19 and outer coupling 16 come to communicate, as the lower end of the fixed cylinder 72 is departed from the flanged portion 73 of the guide cylinder 58.

An example shown in FIG. 11 is as that instead of the auxiliary valve head 57 being placed to the guide cylinder 58 as in FIG. 10, it is attached to the supporter 75 of the bottom of the bladder 5. Also the top end of the spring 64 is abutted to a stopper 76. Same parts having same numerals in FIGS. 10 and 11 as those in FIGS. 1-9 perform same functions.

Figure 12:
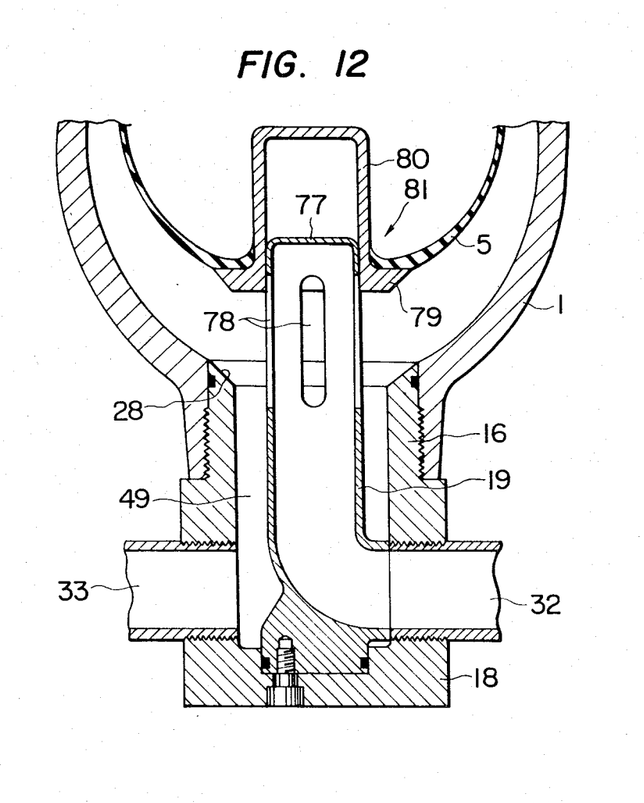
FIG. 12 is a cross section view of an essential part of an example in which a valve body having a guide cylinder is mounted to the bottom of the bladder.

FIG. 12 shows a different type of embodiment than said embodiments. In this Figure, the upper portion of the inner duct 19 forms a guide cylinder 77 extending into the liquid chamber 15. In the circumferential face of the guide cylinder 77, longitudinal apertures 78 are bored. Also an annular valve body 79 is provided in the bottom of the bladder 5 into the gap portion of which the guide cylinder 77 is inserted. With engagement of the guide cylinder 77 into this gap portion 80, a dash pot 81 is formed. Same parts having same numerals in FIG. 12 as those in FIGS. 1-11 perform same functions.

Figure 13:
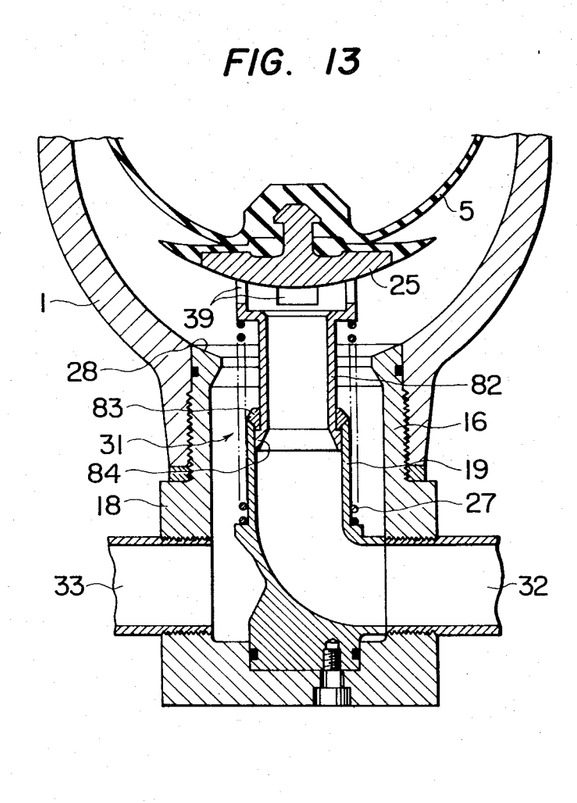
FIG. 13 is a cross section view of an essential part of an example in which a valve body is mounted to the bottom of the bladder and a guide cylinder is attached to the inner duct.

FIG. 13 shows an example in which the valve body 25 is mounted to the bottom of the bladder 5 with the guide cylinder 82 slidable into the inner duct 19. The dash pot 31 is formed by the flanged portion 83 at the top end of the inner duct 19 and the flanged portion 84 of the guide cylinder 82. The guide cylinder 82 is slidably engaged in the inner duct 19 and urged upward with a spring 27. The top end of the guide cylinder 82 abuts against the valve body 25 and in its upper circumferential face, apertures 39 are bored. In FIG. 13, same parts having same numerals, though not explained, as those parts in FIGS. 1-12 perform same functions.

In the embodiments shown in FIGS. 1-13, liquid flows from the inlet port 32 through the inner duct 19 into the liquid chamber 15 and with air spring action of the bladder 5, pulse is absorbed. Then through the outlet path 49 between the inner duct 19 and outer coupling 16, liquid flows out of the outlet port 33 to respective hydraulic devices. In this instance, if an abrupt variation of pressure or force is imparted to the valve 25 as the pump starts operation or the like, by virtue of dash pot 31, speed of such pressure is downed and the valve body 25 is slowly moved.

Figure 14:
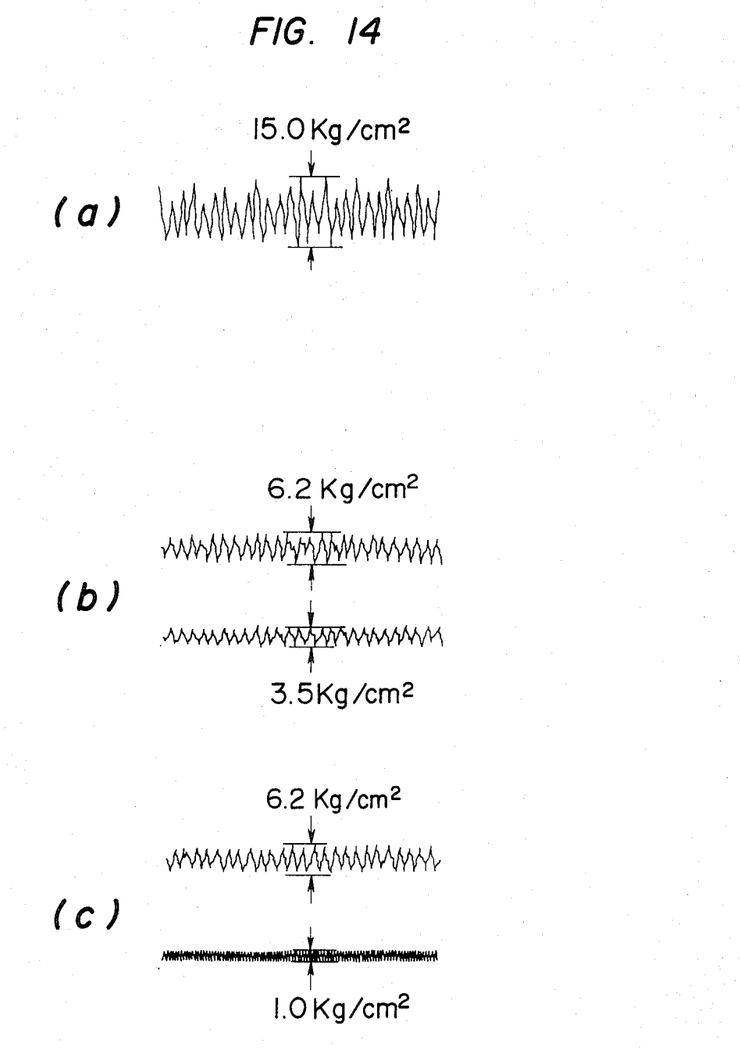
FIG. 14 is oscillographic wave comparing the effect of pulse absorption. (a) shows wave of pulse generated in the hydraulic system. (b) shows wave in the case where piping of hydraulic system accompanying pulse as in (a) is associated to a general accumulator. The upper graph shows pulse wave in the side of liquid inlet and the lower graph shows that in the side of liquid outlet side. (c) shows wave in the case where pulse absorbing device of the present invention is associated to said hydraulic system. The upper graph shows the pulse wave in the side of inlet and lower graph shows in the side of outlet.

FIG. 14 shows graphs representing results of high frequency pulsation absorption by use of pressure dampering means of the conventional embodiment and those of the present invention. In (a), pulsation of pressure liquid through hydraulic unit is oscillographically recorded in which general pressure variation shows 15 kg/cm². (b) shows the case where a conventional accumulator is associated to the above piping. In this instance, the upper graph records the inlet side of accumulator which amounts 6.2 kg/cm². This proves that pulsation absorption has been made insufficiently. (c) shows the case where the pulse absorption means for high pressure liquid of the present invention is associated with the above piping. From the upper graph it is seen that the pressure in the inlet side is 6.2 kg/cm² while the outlet side represented by the lower graph is only 1.0 kg/cm². This proves that how effectively the absorption has been performed.

It is to be noted the present invention is not limited to the above embodiments, any modification may be made without departing from the sprit of the present invention. For example, the case where the inner duct 19 is connected to the inlet port 32, this may be connected to the outlet port side. Also the lower portion of the inner duct 19 is turned at 90 degrees as an elbow, but this inner duct without bend may be connected by providing an inlet port in the bottom of the outer coupling.

What is claimed is:

1. A pulse absorption device comprising:
   a pressure vessel;
   a gas filled bladder housed within said vessel;
   an inlet conduit connected to said vessel and communicating with the interior thereof;
   an outlet conduit connected to said vessel surrounding said inlet conduit forming an annular outlet in cooperation with said inlet conduit;
   valve means to open and close said conduits in response to contraction and expansion of said bladder; and
   dampening means connected to said valve means to dampen said valve means against sudden opening and closing.

2. A pulse absorption device as described in claim 1 further comprising:
   a biasing means to bias said valve means toward an open position.

3. A pulse absorption device as described in claim 2 wherein said valve means and said dampening means are comprised of:
   a valve having a body capable of closing both of said conduits and a stem extending therefrom into said inlet conduit, said stem having on its end opposing said head a piston; and
   a stem casing located within said inlet conduit to slidably guide the axial movement of said stem, said stem casing having a cylinder therein which, in cooperation with said piston, forms a dampening dash pot.

4. A pulse absorption device as described in claim 2 wherein said valve means and said dampening means are comprised of:
   a valve having a body capable of closing both of said conduits and a cylindrical guide member extending therefrom into said outlet, said guide member having a plurality of inlet passageways therethrough;
   an inward stepped first portion affixed inside said guide member so as to slidably bear upon said inlet conduit;
   an outer cylinder affixed to the guide member by a plurality of arms to slidably bear upon said outlet conduit to guide said valve; and an outwardly stepped second portion affixed to the inlet conduit so as to, in cooperation with said first portion, form a dampening dash pot.

5. A pulse absorption device as described in claim 2 wherein said valve means and said dampening means are comprised of:
- a valve having a body capable of closing both of said conduits and a cylindrical guide member extending therefrom into said outlet, said guide member having a plurality of inlet apertures therethrough and a plurality of radially extending ribs;
- an outer cylinder connected to said ribs to slidably bear upon said outlet conduit to guide said valve, said outer cylinder having a peripherally inward extending first portion; and
- said vessel having a stepped second portion to closely receive said first portion to form a dampening dash pot.

6. A pulse absorption device as described in claim 5 wherein said ribs are formed into C-shaped ports which communicate between said vessel and said outlet.

7. A pulse absorption device as described in claim 1 wherein said valve means and said dampening means are comprised of:
- a valve having a body capable of closing both of said conduits and having an inner sliding cylinder extending therefrom into said outlet, said inner sliding cylinder having a plurality of inlet apertures therethrough and an annular inward extending stepped first portion opposing said body;
- an outer cylinder affixed to said inner sliding cylinder by a plurality of ribs, said outer cylinder having a plurality of outlet apertures therethrough;
- a biasing spring interconnected between said outer cylinder and the outlet conduit to bias said valve toward an open position; and
- an annular outward extending stepped second portion on said inlet conduit forming, in cooperation with said first portion, a dampening dash pot.

8. A pulse absorption device as described in claim 2 wherein said valve means and said dampening means are comprised of:
- a valve having a body capable of closing both of said conduits;
- a stem extending from said body into said inlet conduit, said stem having a piston formed on its end opposing said body;
- a cylindrical member affixed to said stem extending into and slidably bearing upon said inlet conduit to guide the movement of said valve, said cylindrical member having a plurality of inlet ports;
- a bladder receiving cup located on the body of said valve to receive the bladder as it expands to protect said bladder against damage; and
- a stem casing within said inlet conduit to slidably guide said stem, said stem casing having a cylinder therein which, in cooperation with said piston, forms a dampening dash pot.

9. A pulse absorption device as described in claim 1 wherein said valve means and said dampening means are comprised of:
- a first valve having a body for closing the outlet conduit, said body having an axial bore therethrough;
- a guide cylinder extending from the body of said first valve coaxially into said outlet for slidable motion along said inlet conduit, said guide cylinder having a plurality of inlet ports therethrough and an annular inward extending first stepped portion;
- a guide portion on said inlet conduit having a plurality of bores therethrough and having an annular outward extending second stepped portion which, in cooperation with said first stepped portion, forms a first dampening dash pot;
- a second auxiliary valve having a head for closing said first valve body axial bore and having a stem extending axially into said guide cylinder, said stem having on its end opposing said head a second piston;
- a housing cylinder affixed to said outlet conduit to slidably guide said guide cylinder and, upon axial movement of said guide cylinder therethrough, cover and uncover said ports;
- a cylindrical stem casing within said guide cylinder to guide the axial movement of said stem, said stem casing having a cylinder which, in cooperation with said piston, forms a second dash pot; and
- a biasing means to bias said first and second valves toward open positions.

10. A pulse absorption device as described in claim 1 wherein said valve means and said dampening means are comprised of:
- a first valve having a body for closing the outlet conduit, said first valve body having an axial bore therethrough;
- a guide cylinder extending from the body of the first valve coaxially into said outlet for slidable motion therealong, said guide cylinder having a plurality of radial ports therethrough and an annular inward extending first stepped portion;
- a guide portion affixed to said inlet conduit having a plurality of fluid passageways therethrough; said guide portion having an annular outward extending second stepped portion which, in cooperation with said first stepped portion, forms a dampening dash pot;
- a housing cylinder affixed to said outlet conduit to slidably guide said guide cylinder and cover and uncover said radial ports;
- a second auxiliary valve affixed to said bladder to open and close said valve body axial bore in response to expansion and contraction of said bladder; and
- biasing means interconnected between said guide portion and said guide cylinder to bias said first valve toward an open position.

11. A pulse absorption device as described in claim 1 wherein said valve means and said dampening means are comprised of:
- a cylindrical hollow guide cylinder affixed to said inlet conduit and extending into the pressure vessel, said guide cylinder having a closed end opposing said inlet conduit, and having a plurality of inlet apertures extending radially therethrough;
- a valve affixed to said bladder having an annular body capable of closing said outlet upon expansion of said bladder, said valve also having a cylindrical gap portion extending into said bladder to closely receive said guide cylinder thereby covering said inlet apertures as said bladder expands and forming, in cooperation with the closed end of said guide cylinder, a dampening dash pot.

12. A pulse absorption device as described in claim 1 wherein said valve means and said dampening means are comprised of:

a valve on said bladder having a body capable of closing both of said conduits;

a guide cylinder extending from said valve body into said inlet conduit to closely slide therein, said guide cylinder having an annular outward extending first flanged portion and a plurality of inlet passageways therethrough;

a biasing spring connected to said valve to bias said valve toward an open position; and a second flanged portion on said inlet conduit extending inward which forms, in cooperation with said first flanged portion, a dampening dash pot.

* * * * *